United States Patent
Pannell

(10) Patent No.: US 6,598,496 B2
(45) Date of Patent: Jul. 29, 2003

(54) SYSTEM FOR DRIVING VEHICLE ACCESSORIES THROUGH AN ELECTRO-MECHANICAL INTERFACE

(75) Inventor: Brian L. Pannell, Fortville, IN (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/811,279

(22) Filed: Mar. 19, 2001

(65) Prior Publication Data

US 2002/0132696 A1 Sep. 19, 2002

(51) Int. Cl.$^7$ .............................................. F16H 37/06
(52) U.S. Cl. ..................... 74/665 L; 74/665 N; 74/11; 74/15.2; 74/414; 180/65.4; 180/65.6
(58) Field of Search .................. 477/5, 6; 74/665 L, 74/665 N, 421 A, 11, 15.2, 15.63, 414; 180/65.1, 65.2, 65.3, 65.4, 65.6, 53.8

(56) References Cited

U.S. PATENT DOCUMENTS

| | | | | |
|---|---|---|---|---|
| 5,558,173 A | * | 9/1996 | Sherman | 180/53.8 |
| 5,635,805 A | * | 6/1997 | Ibaraki et al. | 180/65.4 |
| 5,669,842 A | * | 9/1997 | Schmidt | 475/5 |
| 5,755,303 A | * | 5/1998 | Yamamoto et al. | 180/65.2 |
| 5,969,624 A | * | 10/1999 | Sakai et al. | 180/65.2 |
| 6,048,288 A | * | 4/2000 | Tsujii et al. | 477/5 |
| 6,251,042 B1 | * | 6/2001 | Peterson et al. | 477/3 |
| 6,269,895 B1 | * | 8/2001 | Tanuguchi et al. | 180/65.2 |
| 6,318,487 B2 | * | 11/2001 | Yanase et al. | 180/65.2 |

FOREIGN PATENT DOCUMENTS

JP 2000-278810 A * 10/2000

* cited by examiner

Primary Examiner—Matthew C. Graham
Assistant Examiner—Mariano Sy
(74) Attorney, Agent, or Firm—Leslie C. Hodges

(57) ABSTRACT

An electro-mechanical interface incorporated in a series hybrid auxiliary power unit. According to the present invention the electro-mechanical interface employs a first tier of geared output shafts rotatably supported within a frame and meshingly engaged in a daisy-chain configuration having first and second ends. One end of the first tier of geared output shafts in the daisy-chain configuration meshingly engages a first, geared transfer shaft. The first, geared transfer shaft selectively connects to an internal combustion engine through a selectively disengageable clutch. The other end of the aforesaid first tier of geared output shafts in the daisy-chain configuration meshingly engages a second geared transfer shaft that is continuously connected to a motor/generator. The geared output shafts in the aforesaid daisy-chain configuration are available to drive auxiliary loads. A second tier of geared output shafts are also rotatably supported within the frame. The geared output shafts in the second tier meshingly engage, also in a daisy-chain configuration having first and second ends. One end of the daisy-chain defined by the second tier of geared output shafts meshingly engages a geared linking shaft, and the geared linking shaft selectively connects to a geared transfer shaft associated with the first tier of geared output shafts. The geared output shafts in the second tier are also available to drive auxiliary loads.

12 Claims, 12 Drawing Sheets

SYSTEM FOR DRIVING VEHICLE ACCESSORIES THROUGH AN ELECTRO-MECHANICAL INTERFACE

TECHNICAL FIELD

The present invention relates generally to vehicular transmissions. More particularly, the present invention relates to the operation of vehicular accessory units that are, by virtue of the subject invention, capable of receiving input power from an engine as well as a source of stored electrical energy—either selectively or in combination. Specifically, therefore, the present invention relates to an electro-mechanical interface in the nature of a series hybrid power unit that directs the operating power between the input power sources and the various vehicular accessories.

BACKGROUND OF THE INVENTION

The purpose of a vehicular transmission is to provide a neutral, at least one reverse and one or more forward driving ranges that impart power from an internal combustion engine, and/or other power sources, by which to drive the members that deliver the tractive effort from the vehicle to the terrain over which the vehicle is being driven.

Irrespective of the operative structure of a vehicular transmission per se, some provision is employed for powering accessory units that are required, or desired, for the most effective operation of the vehicle. In a typical prior art series hybrid drive system, as represented by what is currently being used by large metropolitan transit systems, there are four main electrical power conversion systems—i.e.:

1) A main propulsion system that employs an inverter to convert DC electrical power provided by a battery, or the like, to AC electrical power for operating an AC traction drive motor;
2) An auxiliary power unit (generally designated as the APU) that includes an engine, a generator and an inverter;
3) An accessory drive system incorporating an accessory DC to AC inverter to change the DC electrical power provided by one or more batteries, or the like, into AC power in order to drive a plurality of AC drive motors, one drive motor to power each of the vehicle accessories such as the coolant pumps, cooling fans, an air compressor, battery fans, a power steering pump, etc., and;
4) A DC to DC step-down converter to receive DC power from a battery pack, or the like, and provide the proper DC voltage to charge 12 and 24 volt batteries used in the operation of one or more accessories available to the vehicle.

Such series hybrid drive systems also typically utilize four main modes of operation—i.e.:

1) Pure electrical propulsion;
2) Hybrid propulsion;
3) Regenerative braking; and,
4) Charging

SUMMARY OF THE INVENTION

It is, therefore, one primary aspect of the present invention to provide a new and novel system to power vehicular accessory units.

It is another aspect of the present invention provide a new and novel system, as above, that employs an electro-mechanical interface between the accessories and the source, or sources, of power by which the accessories are operated.

It is a further aspect of the present invention to provide new and novel system, as above, that utilizes only two electrical power conversion systems—i.e.: 1) a main propulsion system employing a source of DC electrical power and an AC traction drive motor; and, 2) an auxiliary power unit employing an engine, a motor/generator and the electro-mechanical interface that serves as an accessory drive transfer mechanism.

It is a still further aspect of the present invention to provide new and novel system, as above, wherein the electro-mechanical interface incorporates two separate power output mechanisms (one that may be identified as a "direct driven" mechanism and another that may be identified as a "clutch driven" mechanism).

It is an even further aspect of the present invention to provide new and novel system, as above, that will operate not only the accessories available in the prior art systems but also additional accessories in the nature of a scavenge pump, an air conditioning compressor and a 12/24 volt generator.

These and other aspects of the invention, as well as the advantages thereof over existing and prior art forms, which will be apparent in view of the following detailed specification, are accomplished by means hereinafter described and claimed.

By way of a general introductory description, an electro-mechanical interface for driving accessory loads according to the present invention employs at least a first tier of geared output shafts rotatably supported within a frame and meshingly engaged in a daisy-chain configuration having first and second ends. One end of the first tier of geared output shafts in the daisy-chain configuration meshingly engages a first, geared transfer shaft. The first, geared transfer shaft connects to an internal combustion engine through a releasable, or "disconnect" clutch means. The other end of the aforesaid first tier of geared output shafts in the daisy-chain configuration meshingly engages a second geared transfer shaft that is permanently connected to a motor/generator. The geared output shafts in the aforesaid daisy-chain configuration are available to drive auxiliary loads.

A second tier of geared output shafts are also rotatably supported within the aforesaid frame. The geared output shafts in the second tier meshingly engage, also in a daisy-chain configuration having first and second ends. One end of the daisy-chain defined by the second tier of geared output shafts meshingly engages a geared linking shaft, and the geared linking shaft selectively connects to the first geared transfer shaft in the first tier of geared output shafts through a selectively engageable clutch means. The geared output shafts in the second tier of output shafts are also available to drive auxiliary loads.

As such, powering the specific accessories shown and described herein are only illustrative, and as will become apparent to those skilled in these arts can be modified in numerous ways within the scope and spirit of the invention; the invention being measured by the appended claims and not by the details of the specification.

DESCRIPTION OF THE PREFERRED EMBODIMENT

Figure 1:
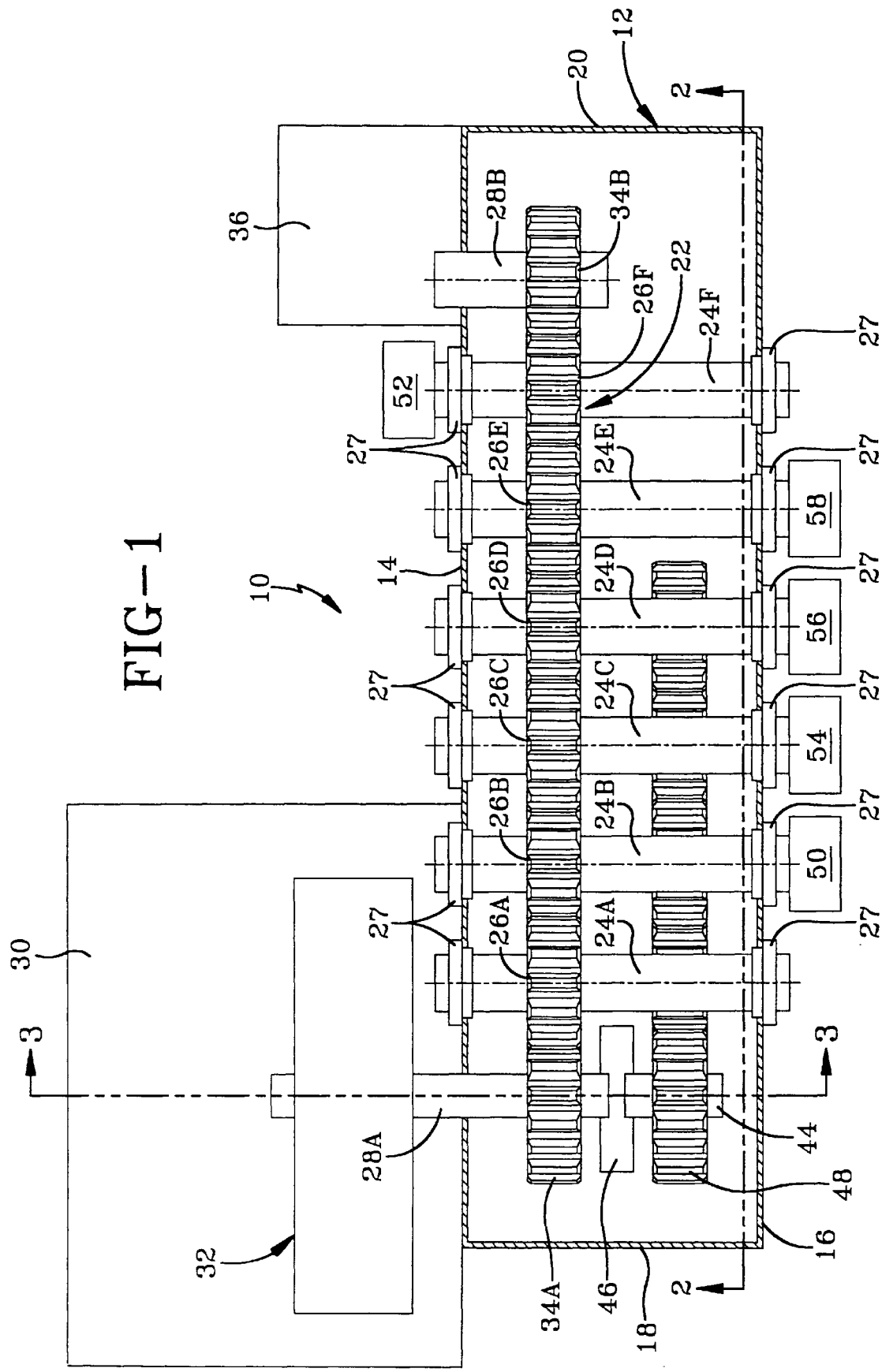
FIG. 1 is a diagrammatic, top plan view of an accessory drive transmission box embodying the concepts of the present invention selectively connectable to an internal combustion engine and continuously connected to a motor/generator.
Figure 2:
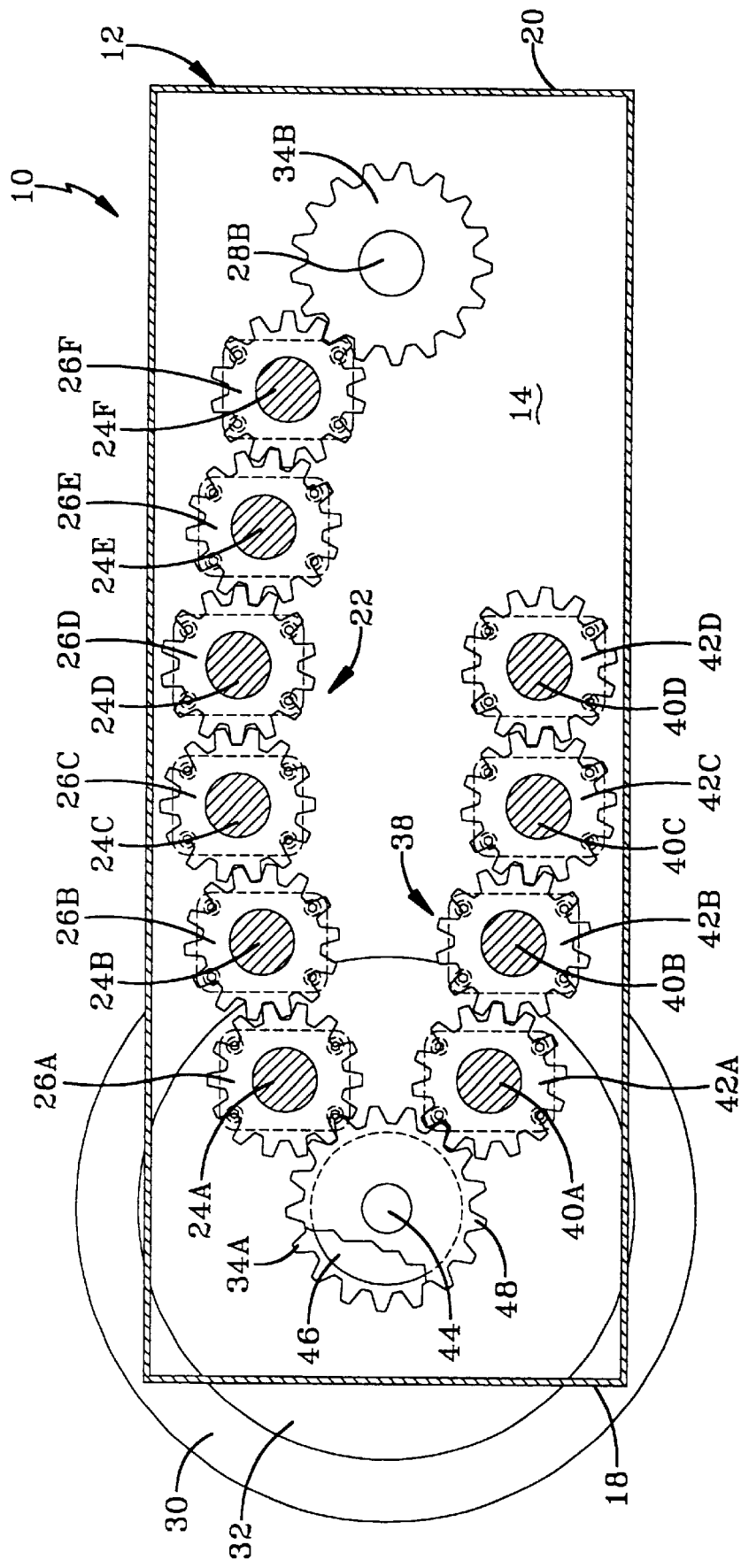
FIG. 2 is a side elevation of the accessory drive transmission box taken substantially along line 2—2 of FIG. 1.

With reference to FIGS. 1 and 2, an accessory drive transmission (ADT) box embodying the concepts of the present invention is designated by the numeral 10. The ADT box 10 may have a rectilinear frame 12 with opposed side walls 14 and 16 conjoined by end walls 18 and 20.

With continued reference to FIGS. 1 and 2, a first tier 22 of geared output shafts—e.g., the six output shafts 24A through 24F—are rotatably supported within the frame 12. Each geared output shaft 24A through 24F supports a corresponding gear 26A through 26F that drives, or is driven by, the respective shaft 24A through 24F. The successive gears 26 are meshingly engaged so that each of the successive gears 26 and their corresponding supporting shafts 24 rotate in unison. The successively engaged, geared output shafts 24 comprising the first tier 22 are disposed in a daisy-chain configuration with the geared shaft 24A comprising the first end of that daisy-chain designated as tier 22 and geared shaft 24F comprising the second end of the daisy-chain designated as tier 22.

As apparent from the previous paragraph, a particular structural member, component or arrangement may be employed at more than one location. When referring generally to that type of structural member, component or arrangement, a common numerical designation is employed. However, when one of the structural members, components or arrangements so identified is to be individually identified, it will be referenced by virtue of a letter suffix employed in combination with the numerical designation employed for general identification of that structural member, component or arrangement. Thus, there are six geared output shafts that are generally identified by the numeral 24, but the specific, individual, geared output shafts are, therefore, identified as 24A, 24B, 24C, 24D, 24E and 24F in the specification and on the drawings. Similarly, there are six gears that are generally identified by the numeral 26, but the specific, individual gears are, therefore, identified as 26A, 26B, 26C, 26D, 26E and 26F in the specification and on the drawings. This same suffix convention shall be employed throughout the specification.

The shafts 24 may, as shown, be rotatably supported between the side walls 14 and 16, and suitable flanged, sleeve bearings such as designated by the numeral 27 may be operatively disposed between each shaft 24 and each side wall 14 and 16.

A first, geared transfer shaft 28A is connected to an internal combustion engine 30, as by an engine disconnect clutch 32. That is, the clutch 32 is normally engaged, but it can be selectively disengaged. The internal combustion engine 30 serves as one source of power into the accessory drive system from Auxiliary Power Unit and is, therefore, often referred to herein as the APU engine 30. The transfer shaft 28A drivingly supports a gear 34A, and the gear 34A meshingly engages gear 26A on geared output shaft 24A in the first tier 22. A second geared transfer shaft 28B is permanently connected to a motor/generator 36. The motor/generator serves, when operating as a motor, as another source of power into the accessory drive system from the APU. The transfer shaft 28B drivingly supports a gear 34B, and the gear 34B meshingly engages gear 26F on geared output shaft 24F in tier 22.

Figure 4:
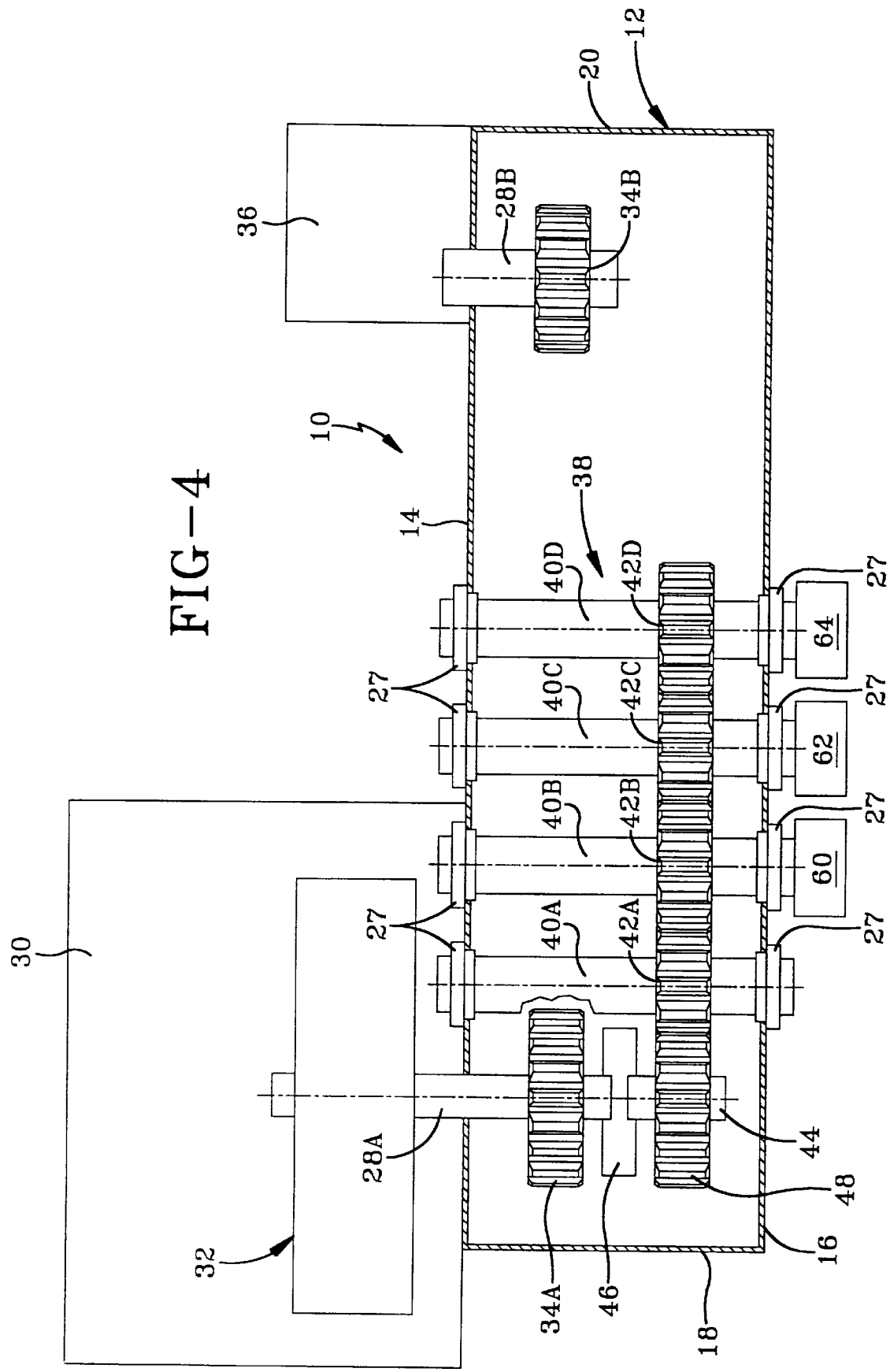
FIG. 4 is a top plan view along line 3—3 of FIG. 3 similar to FIG. 1 but focusing primarily on that daisy-chain of geared output shafts designated as the second tier thereof.

With reference to FIGS. 2 and 4, a second tier 38 of geared output shafts—e.g., the four output shafts 40A through 40D—are also rotatably supported within the frame 12. Each geared output shaft 40A–40D may, as represented, also be rotatably supported from side walls 14 and 16, and a suitable flanged sleeve bearing 27 may be operatively interposed between each shaft 40 and side walls 14 and 16. Each rotatable output shaft 40 drivingly supports a corresponding gear 42A through 42D. The successive gears 42 are meshingly engaged, and the successively engaged, geared shafts 40 present the second tier 38 of output shafts, also in a daisy-chain configuration, with the geared shaft 40A comprising the first end of the daisy-chain represented by tier 38, and with the geared shaft 40D comprising the second end of that daisy-chain.

Figure 3:
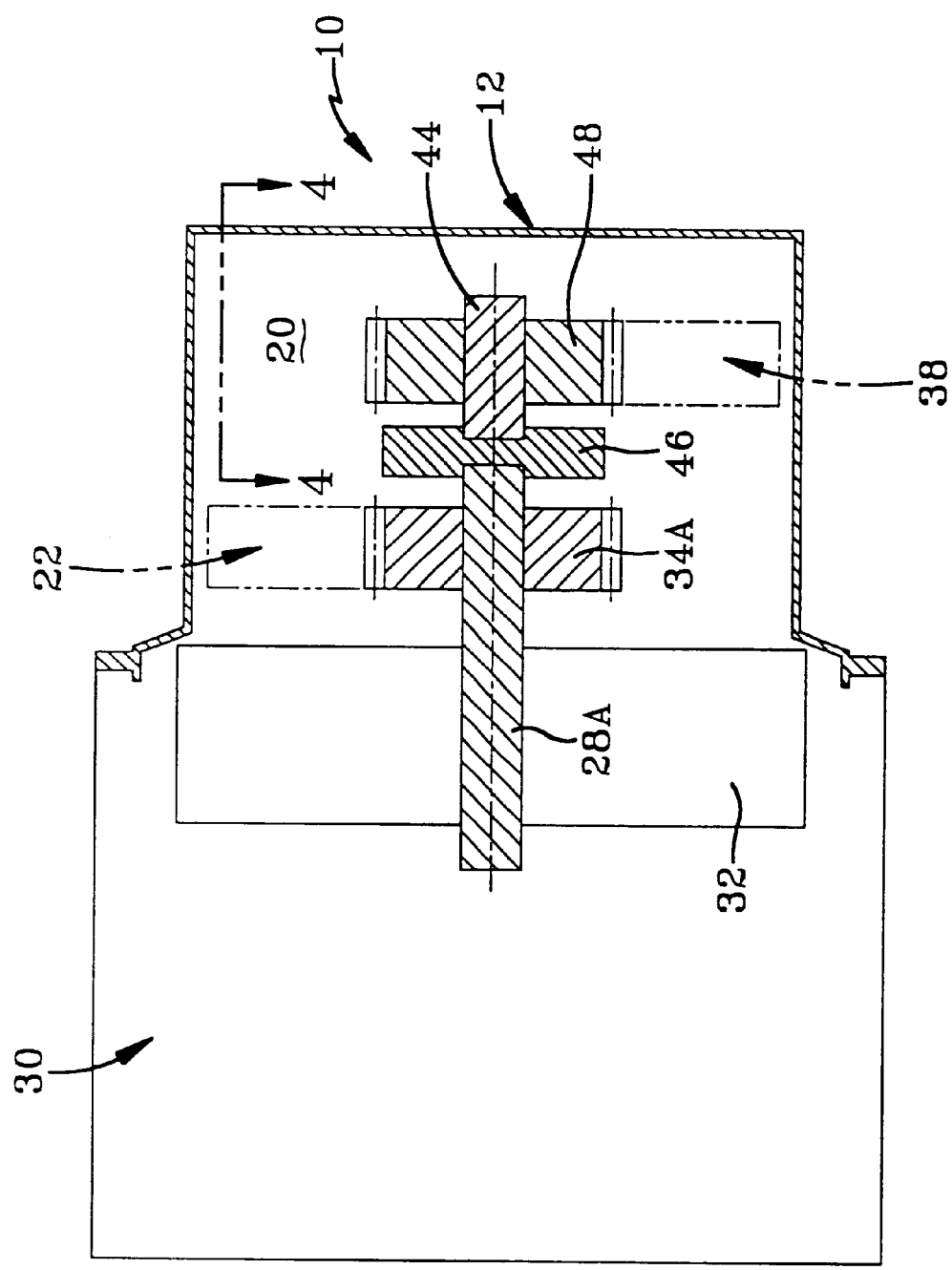
FIG. 3 is an end elevation partially broken away taken substantially along line 3—3 of FIG. 1.

A linking shaft 44 is selectively connected to the first transfer shaft 28A through a power take-off (PTO) clutch 46, and a gear 48 is drivingly secured to the linking shaft 44. The gear 48 meshingly engages the gear 42A on geared output shaft 40A, as is also depicted in FIG. 3.

Before discussing the operation of an ADT box 10 embodying the concepts of the present invention clarity will be enhanced by knowing which accessories may, for example, be driven by which geared shaft. In that regard the accessories driven by the geared shafts 24 in tier 22 are designated as being the "direct driven" accessories. The designation "direct driven" is chosen inasmuch as the clutch 32 is a "disconnect clutch." That is, the clutch 32 is normally applied and is, therefore, directly driven by the APU engine 30. It will be understood that even when the engine disconnect clutch 32 is released, the geared shafts 24 in the first tier 22 remain engaged with the motor/generator 36 to drive, or be driven thereby.

With particular reference to FIG. 1, the "direct driven" accessories operatively connected to the geared shafts 24 in the first tier 22 may typically be two oil pumps 50 and 52 (driven by geared shafts 24B and 24F, respectively), two coolant pumps 54 and 56 (driven by geared shafts 24C and 24D) and a 24 volt alternator 58 (driven by geared shaft 24E). This leaves one geared shaft 24A unused and available for driving an additional accessory or for driving an existing direct driven accessory should it be desirable, or necessary, to relocate one of the direct driven accessories for either convenience or to accommodate some accessory within the space available around the ADT box 10.

On the other hand, the accessories driven by the geared shafts 40 in tier 38 are designated as being the "clutch driven" accessories. The designation "clutch driven" accessories is chosen inasmuch as the PTO clutch 46 must be engaged for the geared output shafts 40 to drive the accessories connected thereto.

With particular reference to FIG. 4, the clutch driven accessories operatively connected to the geared shafts 40 in the second tier 38 may typically be an air conditioning compressor 60 (driven by geared output shaft 40B), an air compressor 62 (driven by geared output shaft 40C) and a power steering pump 64 (driven by geared output shaft 40D). This leaves geared output shaft 40A unused and available for driving an additional accessory, or for driving an existing clutch driven accessory should it be desirable, or necessary, to relocate one of the clutch driven accessories for either convenience or to accommodate the various clutch driven accessories within the space available around the ADT box 10.

As should now be apparent, the ADT box 10 and the mechanism associated therewith serves as an electro-mechanical interface between the power delivery members—i.e.: the APU engine 30 and/or the motor/generator 36—and the accessory units. FIGS. 1 through 4 provide an accurate rendition of a preferred embodiment of the electro-mechanical interface that drives the desired accessories during the several modes of operation accommodated thereby (of which there are four depicted in FIGS. 5 through 8)—viz.:

1) a pure electric mode of propulsion;
2) a hybrid mode of propulsion;
3) a regenerative braking mode of operation, and;
4) a charging mode of operation.

In order to obviate a tedious description that delineates an exact structural arrangement of all accessories depicted in combination with the heretofore described structural configuration of an ADT box 10, conceptual, schematic flow charts are employed in FIGS. 5 through 8 to delineate the source, direction and destination of the power flow achieved by arrangements embodying the concepts of the present invention to operate enumerated accessories. The operation in each mode is described in sufficient detail to enable one skilled in the art to practice the invention with minimal experimentation, and in order to emphasize the advantages achieved by the present invention vis-a-vis the operation of a typical prior art arrangement. The operation of a representative prior art arrangement in each of the four modes is also depicted in conceptual, schematic flow charts in FIGS. 9 through 12, and their operation is also described in sufficient detail to clarify the advantages achieved over the prior art by the present invention.

Before continuing with a description of the operation of either the new and novel system provided by the present invention or the representative prior art arrangement shown and described herein, it should be understood that the operator of a vehicle in which the invention may be incorporated typically has three, well-known, primary devices to control a transmission such as that with which the present invention may be employed. One of the primary control devices is a well known drive range selector (not shown) that directs a conventional electronic control unit (an ECU not shown) to configure the transmission for either the park, reverse, neutral, or forward drive range. The second and third primary control devices constitute an accelerator pedal (not shown) and a brake pedal (also not shown). The information obtained by the ECU from these three primary control sources will hereinafter be referred to as the "operator demand." The ECU also obtains information from a plurality of sensors (input as well as output) as to the status of: the clutches (either applied or released); the APU engine output torque; the unified battery, or batteries, capacity levels; the temperatures of selected vehicular components, including that of the operator and/or passenger cabin; the need to scavenge oil from the engine crankcase; and, the need for compressed air reserve (as used, for example, to apply the brakes). In response to an operator's action, the ECU determines what is required and then manipulates the selectively operated components of, or associated with, the transmission appropriately to respond to the operator demand.

OPERATION OF THE NEW AND NOVEL SYSTEM

In Pure Electrical Propulsion Mode

Figure 5:
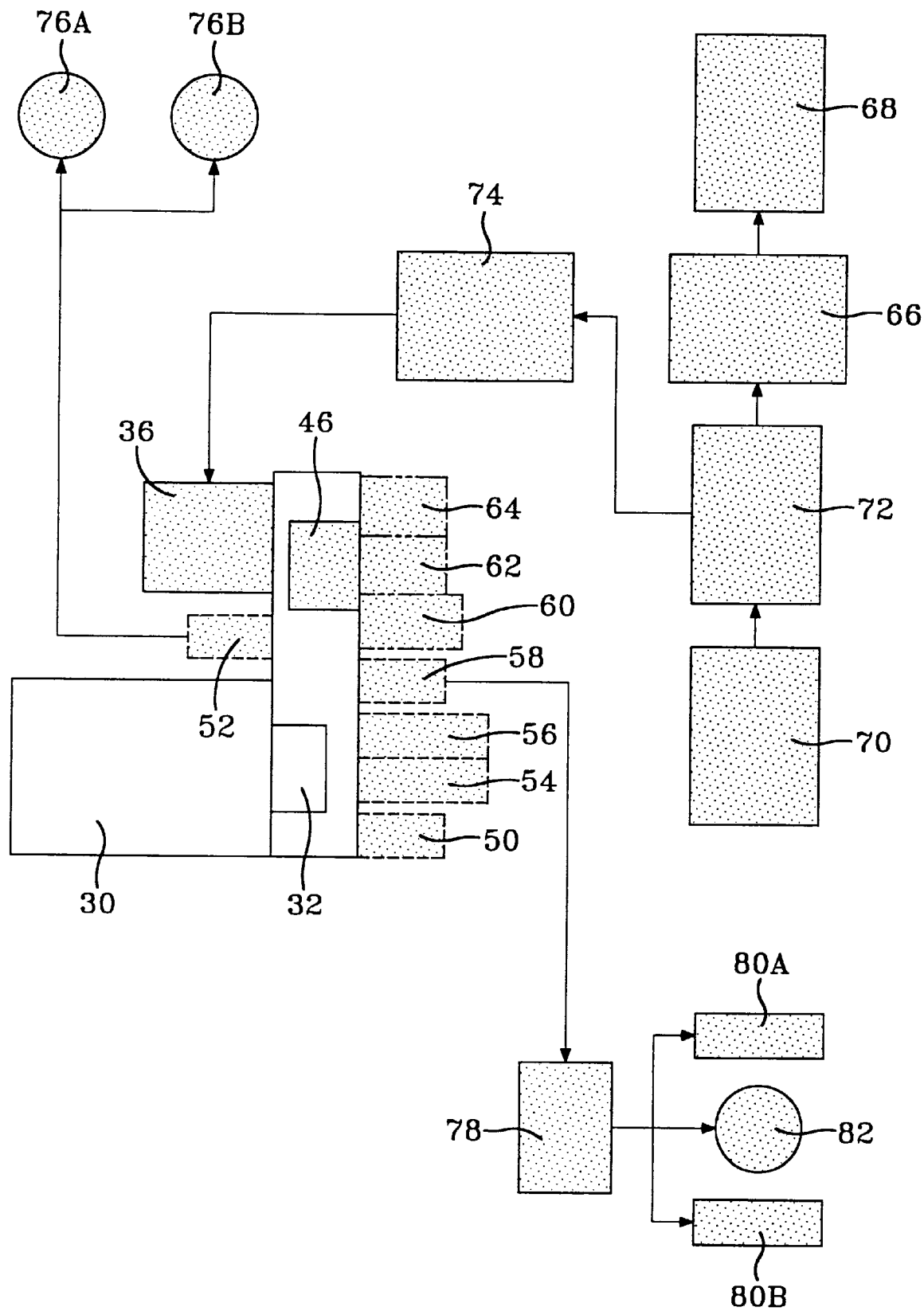
FIG. 5 is a conceptual, schematic flow chart depicting the operation of a system embodying the concepts of the present invention for driving accessory loads in the pure electric mode of propulsion.

With reference, then, to the conceptual schematic presented in FIG. 5, which represents operation of the novel system when the vehicle is operating in its pure electrical mode of propulsion, it is to be understood that all geared output shafts 24 in the daisy-chain configuration comprised of the first tier 22 within the ADT box 10 are connected to the APU engine 30 only through the engine disconnect clutch 32, whereas the motor/generator 36 is continuously connected to all geared output shafts 24 in the aforesaid daisy-chain comprised of the first tier 22 within the ADT box 10. The PTO clutch 46 selectively connects all the geared output shafts 40 in the second tier 38 with the geared output shafts 24 in the first tier 22.

The APU engine 30 is not operating in the pure electrical mode, and the engine disconnect clutch 32 is released. This condition is represented in the drawings by the fact that the schematic depictions of the APU engine 30 and the engine disconnect clutch 32 are not stippled in FIG. 5. To the contrary, the motor/generator 36 is operating, and the PTO clutch 46 is engaged. This condition is represented in FIG. 5 by the fact that the schematic representations of the motor/generator 36 and the PTO clutch 46 are stippled. In fact, all components represented in FIG. 5 that are operative in the pure electrical propulsion mode are stippled in that figure.

To achieve pure electric propulsion in a system that employs the new and novel ADT box 10 there are two electric power conversion systems—compared to the four heretofore required by the representative prior art system that will be hereinafter described in greater operational detail. The two electrical power conversion systems utilized with the new and novel present invention are: 1) the propulsion system itself which comprises a traction inverter 66 and a traction drive AC motor 68 and, 2) the auxiliary power unit (APU) which comprises: the APU engine 30, the motor/generator 36 and the ADT box 10.

A series hybrid APU embodying the concepts of the present invention—when the vehicle in which it is incorporated is operating in its pure electrical propulsion mode—derives its sole operating power by using a high voltage battery pack 70 (typically providing voltage in the range of from about 300 to about 600 volts) that feeds an electrical center director 72 which, in turn, distributes DC electrical power to an APU inverter 74 as well as to the traction inverter 66. The direction of the power flow is depicted by the arrows joining the battery pack 70 to the electrical center director 72 and then to the traction inverter 66 which converts the DC power provided by the battery pack 70 to the AC power that ultimately drives the traction drive motor 68. The traction drive motor 68 supplies the tractive effort from the vehicle to the terrain over which the vehicle is being driven. The tractive effort may be provided in the form of either front or rear wheels of the vehicle on which the tractive drive motor 68 is employed, or it may be provided by the drive gear of a track vehicle.

Arrows similarly designate the power flow of DC power from the electrical center director 72 to the APU inverter 74 and ultimately to the motor/generator 36—which is operating as an AC motor during the pure electrical propulsion mode of operation.

The APU inverter 74 converts the DC electrical power received from the high voltage electrical center director 72 to AC current which operates the motor/generator 36 as a motor that drives the previously described daisy-chain of gear output shafts 24 in the first tier 22. Inasmuch as the PTO clutch 46 is engaged, the motor/generator 36 also drives the daisy-chain of geared output shafts 42 in the second tier 38. Hence, in the pure electrical propulsion mode of operation all accessories are operating. For visual enhancement in the schematic drawings the hereinafter operationally described direct driven accessories are depicted by rectilinear shapes outlined by dashed lines (each dash having substantially the same linear dimension), and the clutch driven accessories are depicted by rectilinear shapes outlined by chain lines (dashed lines of a substantially common linear dimension axially separated by a pair of dashes having significantly shorter linear dimension). Each rectilinear shape that represents an operating accessory during the mode of operation being described is also stippled.

As such, the direct driven accessories which may comprise: a drive unit lubricating and scavenging pump 50; an oil pump 52 that operates a plurality of cooling fans, such as fans 76A and 76B, by hydraulic motors incorporated in the cooling fans; two coolant pumps 54 and 56; and, the 24 volt alternator 58 are operating in the pure electrical propulsion mode. In addition, the clutch driven accessories which may comprise: the air conditioning unit 60; the air compressor 62; and, the power steering pump 64 are also operating in the pure electrical propulsion mode.

With continued reference to FIG. 5 it will be observed that the 24 volt alternator 58, which may include a rectifier, provides charging power to a 12/24 volt battery pack 78. The battery pack 78, in turn, drives battery fans, such as fans 80A and 80B, and the heating, ventilating and air conditioning fan 82.

It should be observed that in pure electrical propulsion mode a system that incorporates the concepts of the present invention effects operation of all vehicular accessories thereby. Hence, all accessories are designated by stippled rectangles in FIG. 5.

In The Hybrid Propulsion Mode

Figure 6:
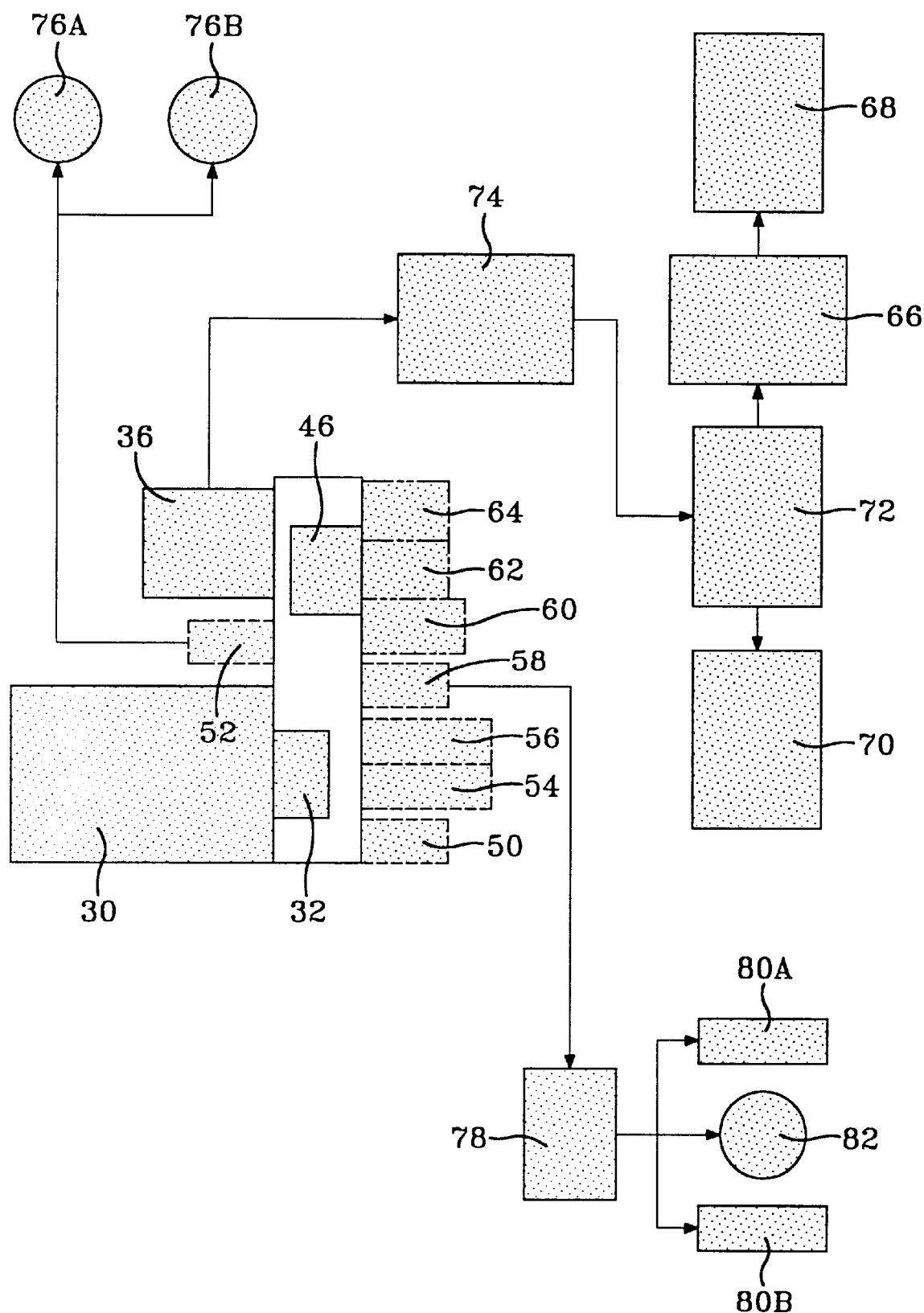
FIG. 6 is a conceptual, schematic flow chart depicting the operation of a system embodying the concepts of the present invention for driving accessory loads in a hybrid mode of propulsion.

To switch from pure electrical operation, represented in FIG. 5, to hybrid operation, as represented in FIG. 6, the engine disconnect clutch 32 is engaged, and the PTO clutch 46 remains engaged. With the engine disconnect clutch 32 newly engaged, the rotation of the geared output shafts 24 causes the transfer shaft 28A to rotate, thereby starting the engine 30. Upon the starting of the engine 30, and with the PTO clutch 46 still engaged, all the geared output shafts 24 and 40 will be driven by the engine 30. As such, the engine 30 also drives the motor/generator 36 which thereby operates as a generator. The resulting AC power flow supplied by the motor/generator 36 feeds AC power to the inverter 74 which serves as a rectifier to convert the AC power provided by the motor/generator 36 to the DC power that is then directed to the high voltage electrical center 72.

The high voltage electrical center 72 thus supplies DC power to the traction inverter 66, which converts the DC power to AC power for operating the traction drive motor 68. The high voltage electrical center director 72 also supplies DC power to the high voltage battery pack 70 for recharging the batteries contained therein.

The various accessories all continue to operate in response to the electro-mechanical interface provided by the accessory drive transmission box 10 to operate in exactly the same manner as they did when operating in the pure electrical mode, as previously described herein. Accordingly, all rectangular representations of accessories in FIG. 6 are also stippled.

In The Regenerative Braking Mode

Figure 7:
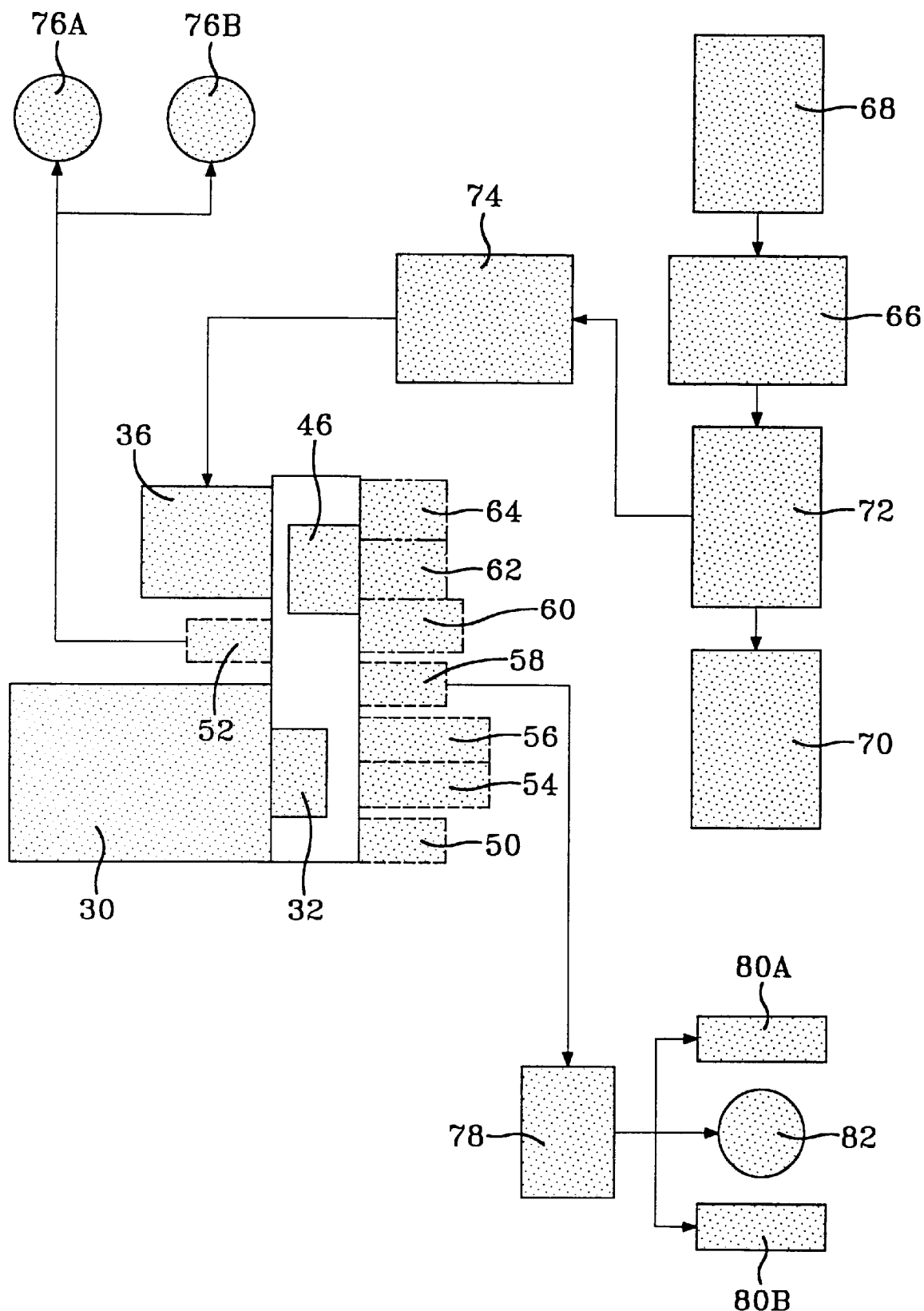
FIG. 7 is a conceptual, schematic flow chart depicting the operation of a system embodying the concepts of the present invention for driving accessory loads in a regenerative braking mode of operation.

In regenerative operation, as depicted in FIG. 7, the tractive drive motor 68 retro-rotates to generate AC power in response to the kinetic energy of the moving vehicle, as in representative prior art assemblies. This AC power passes through the traction inverter 66, operating as a rectifier, to deliver DC power to the high voltage electrical center director 72. From the electrical center director 72 the DC power is directed to the inverter 74 which provides AC power the motor/generator 36 such that it operates as a motor. The electrical center director 72 also directs power to recharge the high voltage battery pack 70. Thus, the load on the tractive drive motor 68 serves not only to slow the vehicle but also to replace some of the energy to the high voltage battery packs 70.

Moreover, in an improved system embodying the concepts of the present invention, instead of limiting the amount of usable regenerative electric power to the amount that the high voltage batteries can accept, the excess available energy is used by the motor/generator 36—operating as a motor—not only to drive all the geared output shafts 24 and 40, and thus also all of the accessory loads but also to increase the speed of the idling (non-fueled) engine 30. This is termed "regenerative blending."

It should also be understood that if there is still excess energy available, it could be absorbed to operate a well known engine exhaust brake in order to increase the horsepower required to turn the engine 30, but even so, all the accessories continue to operate as shown and described in conjunction with the aforesaid explanation of the hybrid propulsion mode of operation.

In The Charging Mode

Figure 8:
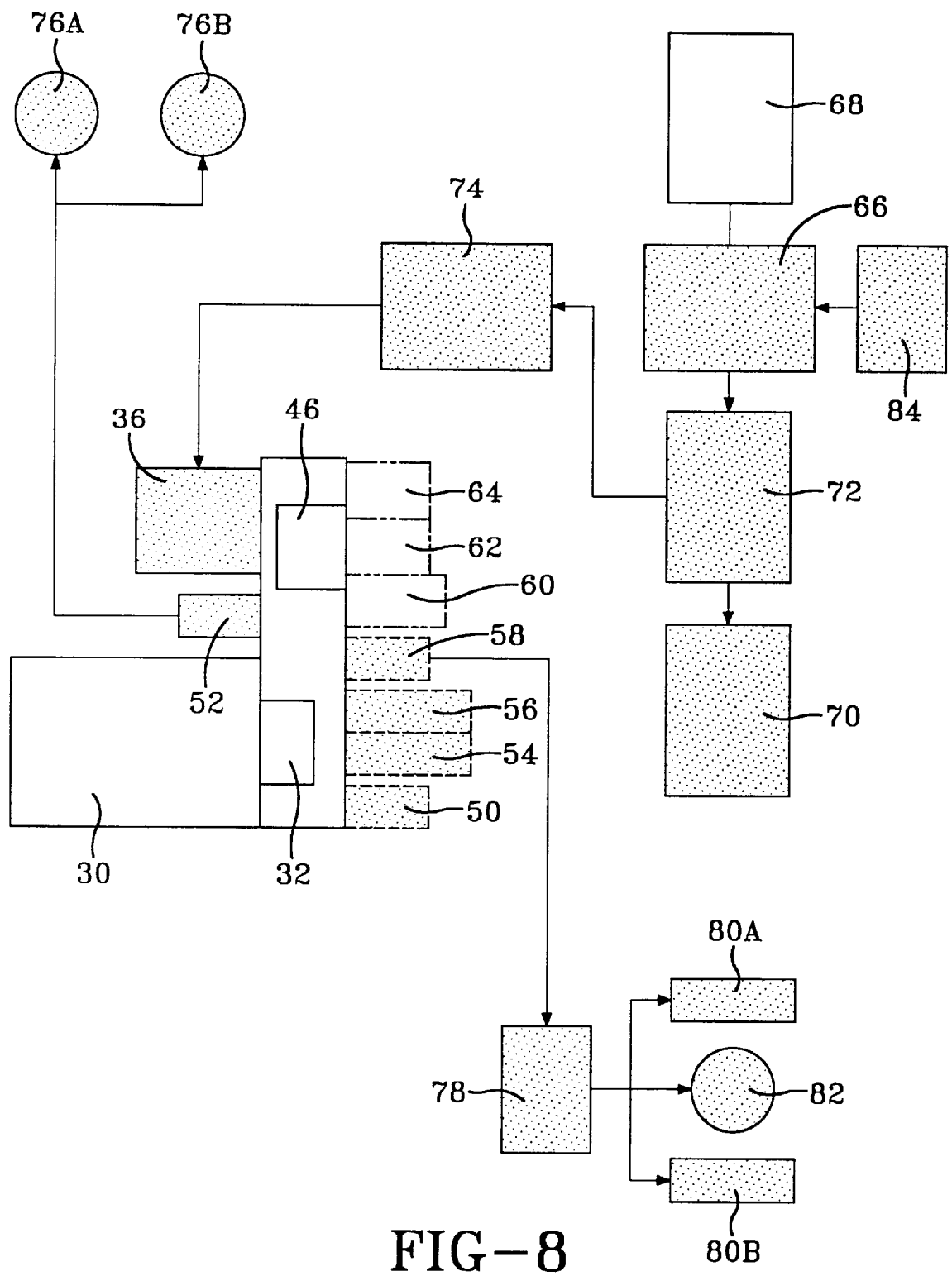
FIG. 8 is a conceptual, schematic flow chart depicting the operation of a system embodying the concepts of the present invention during the charging mode of operation.

In the charging mode of operation, as depicted in FIG. 8, the vehicle is at rest, the engine disconnect clutch 32 is not engaged, and, in fact, the engine 30 is not running. Moreover, the PTO clutch 46 is also not applied. As such, the non-essential, clutch driven accessories such as the A/C unit 60, the vehicle air compressor 62 and the power steering pump 64 operated by the three geared output shafts 42B, 42C and 42D are idling. On the contrary, those accessories deemed essential—e.g.: the direct driven accessories such as the cooling pumps 54 and 56, the lubricating pump 50, the oil pump 52 operating the cooling fans 76A and 76B and the 12/24 volt generator 58 (i.e.: those accessories operated by the geared output shafts 24)—are powered by the generator 36 operating as a motor from a source of power hereinafter identified.

It should be noted that these accessories would likely be required to operate if, as typical, the traction inverter 66 is utilized as an on-board charger. That is, in the charge mode an external source of power is applied to the system. For example, one can feed AC power from a commercial electrical power source available through an AC outlet 84, into the traction inverter 66 which, operating as a rectifier, will deliver DC power to the high voltage electrical center director 72. That DC power will, in part, be applied to charge the battery pack 70 and, in part, directed to the APU inverter 74 which delivers AC power to the motor/generator 36 so that it will operate as a motor to drive the accessories mentioned above as being highly desirable during the charging mode, particularly when the traction inverter 66 is serving as the on-board charger.

It should also be understood that whereas the external power source utilized to operate the system in its charging mode may typically constitute an AC commercial power source, with today's burgeoning interest in fuel cell technology, it may well be that DC power might be delivered directly to the high voltage electrical center 72 from a fuel cell (not shown). That DC power could be fed directly to charge the battery pack 70, and without the need for the traction inverter 66 to serve as an on-board charging device, none of the accessories would necessarily be required during the charging mode of the new system.

As such, those skilled in these arts will appreciate that with the new and novel APU system disclosed herein, the operation of the critical accessories—e.g.: the speed of the 12/24 volt alternator 58, the temperatures of the coolant and other components—can be tailored, as desired, to provide the most favorable operating conditions.

Description of Representative Prior Art Arrangement

Figure 9:
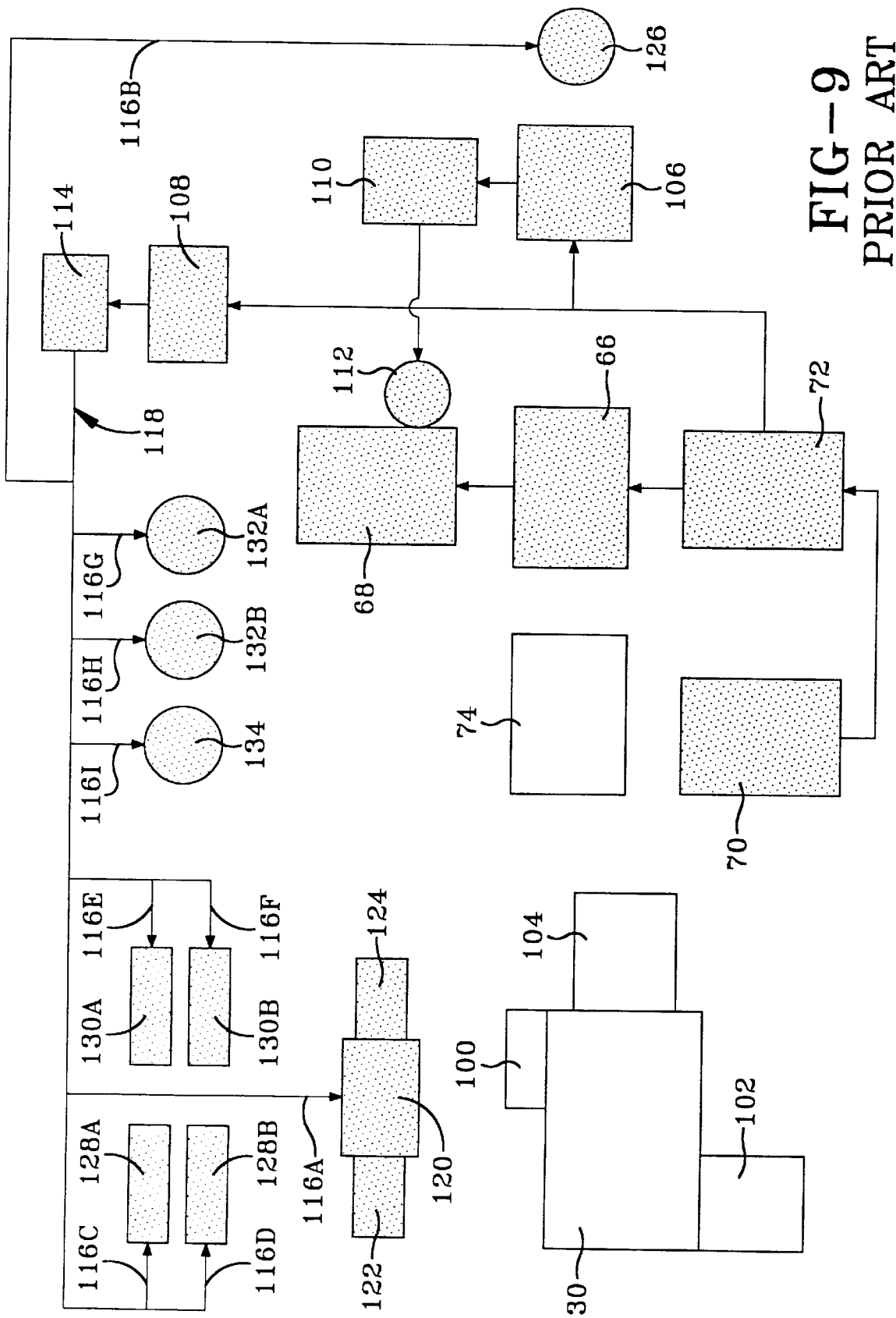
FIG. 9 is a conceptual, schematic flow chart depicting a representative prior art system for driving accessory loads in a pure electric mode of propulsion.

In the representative prior art arrangement depicted in FIG. 9, there is, as in the new system, an engine 30, a high voltage battery pack 70, a high voltage electrical center director 72, a traction inverter 66 and a traction drive 68. Beyond those basic essentials the prior art is quite distinct from the new and novel system heretofore described, and as such, even similar components will be distinctly numbered and described.

For example, the engine 30 in the prior art arrangement has a dedicated starter 100, and the engine directly drives an air conditioning compressor 102 as well as a generator 104. However, neither the air conditioning compressor 102 nor the generator 104 function unless the engine 30 is running.

In order to impart a sufficient description of the prior art arrangement in the most meaningful light, as well as to focus on the operation of that prior art arrangement, one can now skip directly to the operation of the representative prior art arrangement. As such, let us consider the operation of the representative prior art arrangement in the same order as the operation of the new and novel system was heretofore described herein.

Operation of a Representative Prior Art System

Prior Art Operation in the Pure Electrical Propulsion Mode

In the pure electrical mode of propulsion by the prior art arrangement, as conceptually depicted schematically in FIG. 9, the engine 30 is not running inasmuch as all of the required power is being supplied by the high voltage battery packs 70. The DC power available from the high voltage battery pack 70 is fed through the high voltage electrical center director 72 to the traction inverter 66 as well as to a DC/DC voltage regulator 106 and to an accessory inverter 108.

The traction inverter 66 provides the required AC power to the traction drive motor 68. The DC/DC regulator 106 provides DC power in the voltage required to charge the 12/24 volt batteries 110. The 12/24 volt batteries 110 drive a DC motor 112 that powers a lubricating and cooling pump (not shown) within the traction drive motor 68.

The accessory inverter 108 feeds the resulting AC current to an accessory power distribution switching box 114. The switching box 114 may incorporate a plurality of mechanical contactors (not shown) that may selectively provide AC power to the individual conduits 116 incorporated in a wiring harness 118 which supplies power to the desired three phase motors, as many as one motor to operate each selected accessory.

Representative accessory motors and their wiring connection to the switching box 114 is typically as follows:

For example, conduit 116A may transmit power from the accessory power distribution box 114 to a motor 120 that drives both an air compressor 122 and a power steering pump 124. Conduit 116B may similarly transmits power to a fan motor 126 by which to cool the DC/DC regulator 106. Conduits 116C and 116D may deliver power to two coolant pump motors 128A and 128B, respectively. Conduits 116E and 116F may deliver power to two battery fan motors 130A and 130B, respectively. Conduits 116G and 116H may deliver power to two cooling fan motors 132A and 132B, respectively. Conduit 116I delivers power to an HVAC fan motor 134.

Prior Art Operation in the Hybrid Mode

Figure 10:
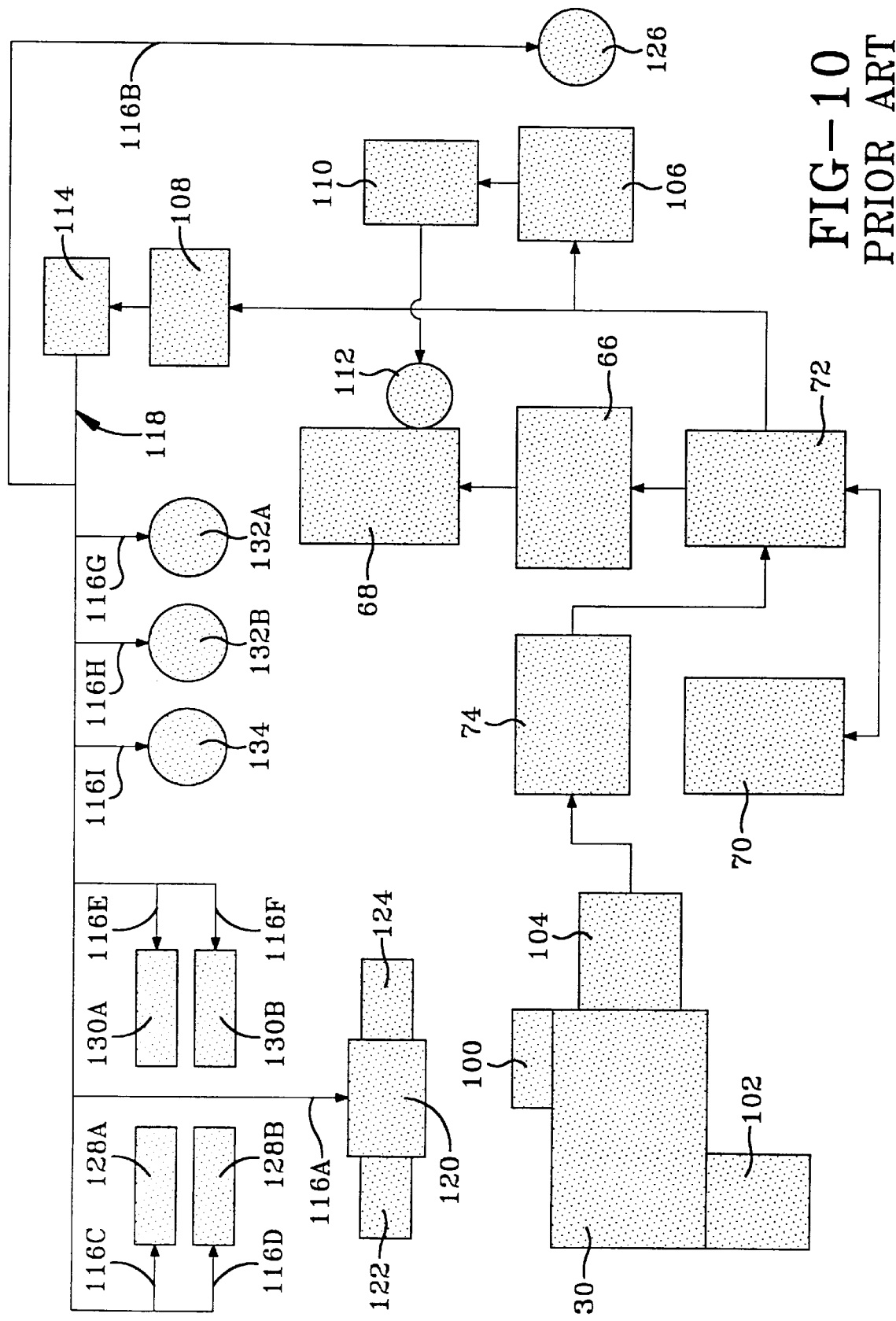
FIG. 10 is a conceptual, schematic flow chart depicting a representative prior art system for driving accessory loads in a hybrid mode of propulsion.

When transferring from the pure electric propulsion mode depicted in FIG. 9 to the hybrid propulsion mode, the APU engine 30, as represented in FIG. 10, is started by the 12 or 24 volt starting motor 100, and the engine 30 then drives not only the generator 104 to supply AC power to the APU inverter 74 but also the A/C compressor 102. The inverter 74 converts the AC power supplied by the generator 104 into DC power that is fed to the high voltage electrical center 72. Otherwise, the power flow is basically the same as in the pure electrical propulsion mode of operation. The primary difference is that power is supplied from the APU inverter 74 through the high voltage electrical center 72 primarily to the traction drive inverter 66 and secondarily to the accessory inverter 108 to the extent that the desired power is available, and if there is sufficient power remaining from that delivered by the APU inverter 74 to the electrical center 72, that remaining power may assist in charging the battery pack 70. Generally, however, the battery pack 70 must augment the power delivered to the high voltage electrical center director 72 from the APU inverter 74.

As in the pure electrical propulsion mode of operation, the traction drive inverter 66 provides the required AC power to the traction drive motor 68, and the accessory inverter 108 feeds the resulting AC current to the power distribution switching box 114, which supplies those accessory motors stippled in FIG. 10.

In addition, because the engine 30 is operating, the A/C compressor 102 will also operate, and the representation thereof in FIG. 10 is, therefore, also stippled.

Prior Art Operation in the In Regenerative Braking Mode

Figure 11:
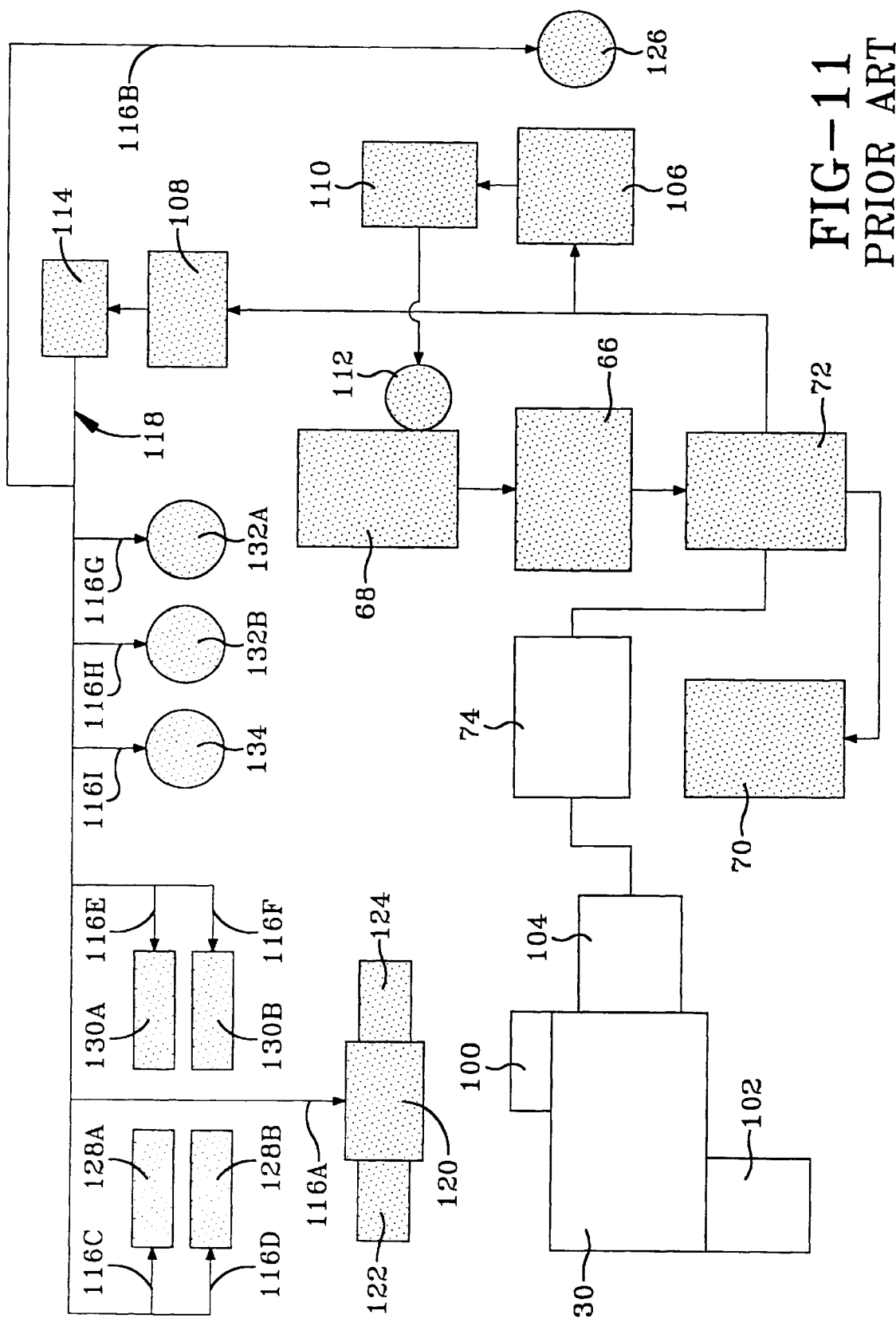
FIG. 11 is a conceptual, schematic flow chart depicting a representative prior art system for driving accessory loads in a regenerative braking mode of operation; and, FIG. 12 is a conceptual, schematic flow chart depicting a representative prior art system for driving accessory loads during the charging mode of operation.

When transferring to the regenerative mode of operation, as depicted in FIG. 11, power is being produced by the traction drive unit 68 which is operating in a generating mode. The regenerated electrical power is returned to the high voltage battery pack 70 to the extent that the batteries can accept the current. Use of regenerated power is, in prior art arrangements, severely limited because the batteries are unable to absorb as much current as the regenerative mode is capable of producing, thereby creating a variation in brake feel as the ability of the high voltage batteries 70 to accept the regenerative power increases and decreases. Even so, some of the excess power is also directed from the electrical center director 72 to the DC/DC regulator 106 and the accessory inverter 108 to operate these accessory loads.

Prior Art Operation in the Charging Mode

Figure 12:
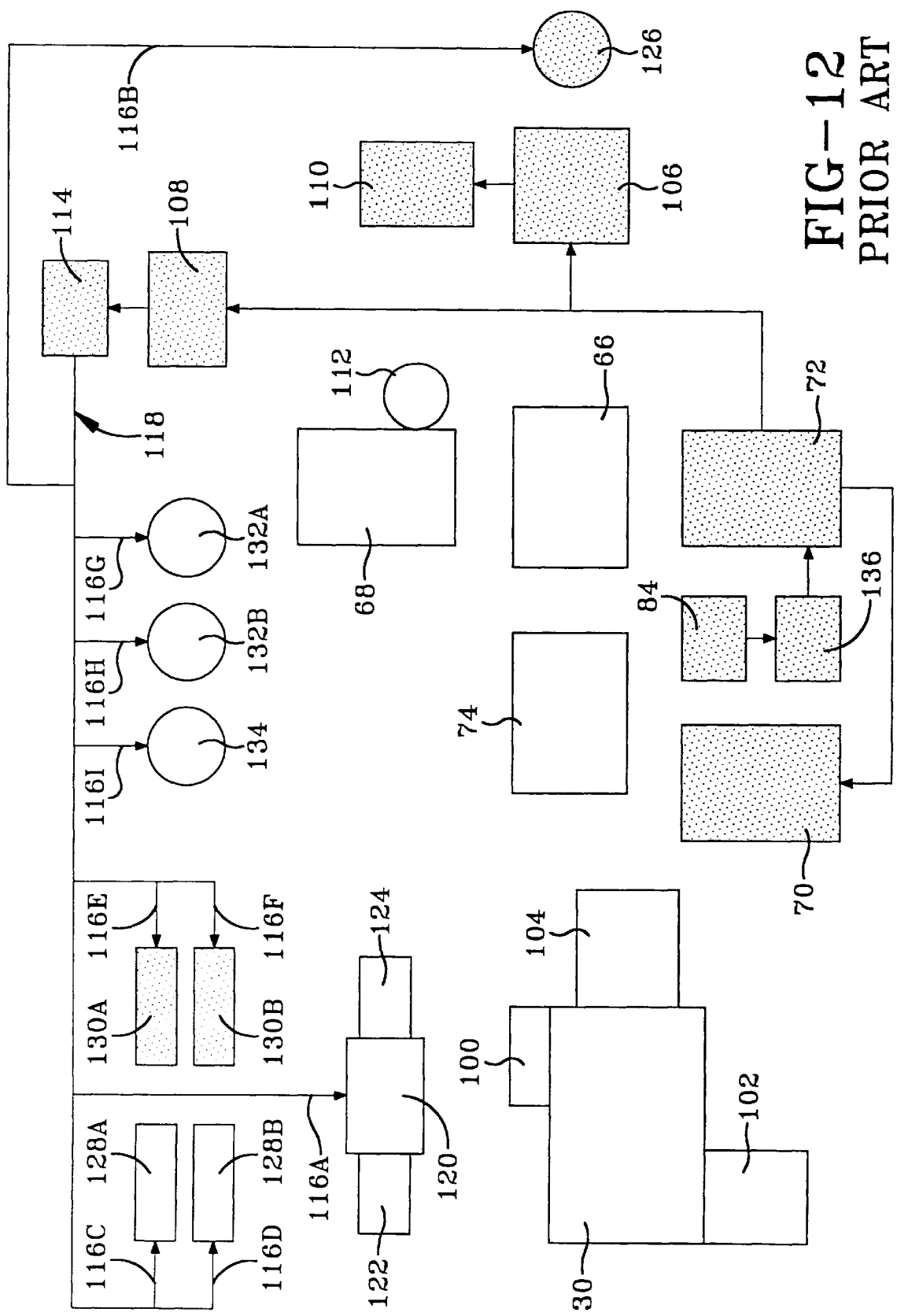

When prior art systems are operating in the charging mode, as represented in FIG. 12, the DC/DC converter fan 126 and the battery cooling fans 130A and 130B are the only accessories required to be operating. The remaining accessories are disconnected from the accessory drive system via the power distribution switching box 114 that contains the selectively operated contactors. The high voltage batteries are charged by a separate off-board charge unit 136 using AC power from a commercial electrical power source available through an AC outlet 84. The DC to DC regulator 106 is also enabled to charge the batteries 110.

SUMMATION

As shown and described, a system embodying the concepts of the present invention drive the vehicle accessories through a new and novel electro-mechanical interface. The electro-mechanical interface employs two tiers of geared output shafts, the geared output shafts in each tier being meshingly engaged to each other and arranged in a daisy chain configuration. One such tier is not only selectively connected to an internal combustion engine through an engine disconnect clutch but is also continuously connected to a motor/generator. The second tier is selectively connected to the first tier by virtue of power take-off clutch. Each output shaft in each tier is available mechanically to drive at least one vehicle accessory.

CONCLUSION

While only a preferred embodiment of the present invention is disclosed, it is to be understood that the concepts of the present invention are susceptible to numerous changes apparent to one skilled in the art. Therefore, the scope of the present invention is not to be limited to the details shown and described but is intended to include all variations and modifications which come within the scope of the appended claims.

As should now be apparent, the present invention utilizes only two electrical power conversion systems rather than the four required by the prior art, one of which comprises an electro-mechanical interface that serves as an accessory drive transfer mechanism, as well as fulfilling the remaining aspects of the invention.

What is claimed is:

1. An electro-mechanical system for driving accessory loads in a series hybrid auxiliary power unit incorporated in a vehicle, said system comprising:

a frame;

at least a first tier of a plurality of geared output shafts rotatably supported within said frame and meshingly engaged in a daisy-chain configuration having first and second ends;

one end of said first tier of geared output shafts in said daisy-chain configuration meshingly engaging a first geared transfer shaft;

the other end of said first tier of geared output shafts in said daisy-chain configuration meshingly engaging a second geared transfer shaft that is continuously connected to a motor/generator;

said first geared transfer shaft operatively connected to an internal combustion engine through selectively disengageable clutch means;

a second tier of a plurality of geared output shafts rotatably supported within said frame and meshingly engaged in a daisy-chain configuration having first and second ends;

at least one end of said second tier of geared output shafts in said daisy-chain configuration meshingly engaging a geared linking shaft;

said geared linking shaft selectively connected to one of said geared transfer shafts associated with said first tier of geared output shafts through a power take-off clutch; and said geared output shafts in said first and second tier of output shafts being available to drive auxiliary loads.

2. An electro-mechanical system for driving accessory loads in a series hybrid auxiliary power unit, as set forth in claim 1, wherein:

a high voltage battery pack is provided as an on-board source of electric power;

a traction drive motor supplies the tractive effort from the vehicle to the terrain over which the vehicle is to be driven;

pure electric propulsion is effected by releasing said selectively disengageable clutch means, the engine not operating, and engaging said power take-off clutch such that said motor/generator, operating as a motor powered by said high voltage battery pack, drives the accessories connected to the geared output shafts in said first and second tier; and, said high voltage pack also provides power to the traction drive motor to effect pure electric propulsion.

3. An electro-mechanical system for driving accessory loads in a series hybrid auxiliary power unit, as set forth in claim 2, wherein:

transition from pure electric propulsion to hybrid propulsion is effected by engaging said selectively disengageable clutch means to start said internal combustion engine while maintaining said power take-off clutch engaged;

operation of said internal combustion engine drives said motor/generator as a generator which drives said traction drive motor and supplies power to recharge said high voltage battery pack.

4. An electro-mechanical system for driving accessory loads in a series hybrid auxiliary power unit, as set forth in claim 3, wherein:

transition from hybrid propulsion to regenerative operation whereby the kinetic energy of the moving vehicle reverses operation of the traction drive motor such that it generates AC power;

the AC power so generated is rectified to DC power;

an inverter changes a pardon of said rectified DC power to AC power that drives the motor/generator as a motor to power all the geared output shafts in said first and second tiers and thereby operate all the accessories; and a portion of said rectified DC power also serves to replace energy to said high voltage battery pack.

5. An electro-mechanical system for driving accessory loads in a series hybrid auxiliary power unit, as set forth in claim 4, wherein:

the power provided by the motor/generator to drive the geared output shafts in excess of the power provided by the internal combustion engine serves to effect regenerative blending.

6. An electro-mechanical system for driving accessory loads in a series hybrid auxiliary power unit, as set forth in claim 2, wherein:

said traction drive motor that supplies the tractive effort from the vehicle to the terrain over which the vehicle may be driven is inoperative during a charging mode of operation;

a traction inverter that normally converts DC power from the high voltage battery pack to AC power for driving said traction drive motor is adapted to receive AC power from a commercial source of electrical power and, operating as a rectifier, converts the AC power to DC power;

an electrical center director receives the DC power from said traction inverter, while operating as a rectifier, and directs a portion thereof to said high voltage battery pack to recharge the same; and, said electrical center director also directs a portion of said DC power from said traction inverter, while operating as a rectifier, to an auxiliary power unit inverter to convert the DC power so received to AC power for operating said motor/generator as a motor to effect the desired cooling during a recharge mode of operation.

7. A vehicle propulsion system comprising:

a traction drive motor to supply the tractive effort from the vehicle to the terrain over which the vehicle is to be driven;

a high voltage battery pack to supply DC power;

an electrical center director to receive the DC power from said battery pack;

a traction inverter to receive DC power from said electrical center director to convert said DC power to AC power for driving said traction drive motor;

a series hybrid auxiliary power unit including a motor/generator;

an inverter included in said series hybrid auxiliary power unit to receive DC power from said electrical center director and provide AC power to said motor/generator so that said motor/generator may operate as a motor;

an internal combustion engine included in said series hybrid auxiliary power unit;

an electro-mechanical accessory drive transmission box to receive power from said motor/generator selectively to operate at least two classes of accessories;

said electro-mechanical accessory drive transmission box having a frame;

at least a first tier of a plurality of geared output shafts rotatably supported within said frame and meshingly engaged in a daisy-chain configuration having first and second ends;

one end of said first tier of geared output shafts in said daisy-chain configuration meshingly engaging a first geared transfer shaft;

said first geared transfer shaft operatively connected to said internal combustion engine through selectively disengageable clutch means;

said geared output shafts in said first tier being available to drive auxiliary loads;

the other end of said first tier of geared output shafts in said daisy-chain configuration meshingly engaging a second geared transfer shaft that is continuously connected to said motor/generator;

a second tier of a plurality of geared output shafts rotatably supported within said frame and meshingly engaged in a daisy-chain configuration having first and second ends;

at least one end of said second tier of geared output shafts in said daisy-chain configuration meshingly engaging a geared linking shaft;

said geared linking shaft selectively connected to one of said geared transfer shafts associated with said first tier of geared output shafts through a power take-off clutch; and said geared output shafts in said second tier of output shafts being available to drive auxiliary loads.

8. A vehicle propulsion system, as set forth in claim 7, wherein:

pure electric propulsion is effected by releasing said selectively disengageable clutch means, the engine not operating, and engaging said power take-off clutch such that said motor/generator, operating as a motor powered by said high voltage battery pack, drives the accessories connected to the geared output shafts in said first and second tier; and, said high voltage pack also provides power to the traction drive motor to effect pure electric propulsion.

9. A vehicle propulsion system, as set forth in claim 8, wherein:

transition from pure electric propulsion to hybrid propulsion is effected by engaging said selectively disengageable clutch means to start said internal combustion engine while maintaining said power take-off clutch engaged;

operation of said internal combustion engine drives said motor/generator as a generator which drives said traction drive motor and supplies power to recharge said high voltage battery pack.

10. A vehicle propulsion system, as set forth in claim 9, wherein:

transition from hybrid propulsion to regenerative operation whereby the kinetic energy of the moving vehicle reverses operation of the traction drive motor such that it generates AC power;

the AC power so generated is rectified to DC power;

an inverter changes a portion of said rectified DC power to AC power that drives the motor/generator as a motor to power all the geared output shafts in said first and second tiers and thereby operate all the accessories;

a portion of said rectified DC power also serves to replace energy to said high voltage battery pack.

11. A vehicle propulsion system, as set forth in claim 10, wherein:

the power provided by the motor/generator to drive the geared output shafts, instead of the power being provided by the internal combustion engine, serves to effect regenerative blending.

12. A vehicle propulsion system, as set forth in claim 10, wherein:

said traction drive motor chat supplies the tractive effort from the vehicle to the terrain over which the vehicle may be driven is inoperative during a charging mode of operation;

said traction inverter that normally converts DC power from the high voltage battery pack to AC power for driving said traction drive motor is adapted to receive AC power from a commercial source of electrical power and, operating as a rectifier, converts the AC power to DC power;

said electrical center director receives the DC power from said traction inverter, while operating as a rectifier, and directs a portion thereof to said high voltage battery pack to recharge the same; and, said electrical center director also directs a portion of said DC power from said traction inverter, while operating as a rectifier, to an auxiliary power unit inverter to convert the DC power so received to AC power for operating said motor/generator as a motor to effect the desired cooling during a recharge mode of operation.

* * * * *